Figure 8:
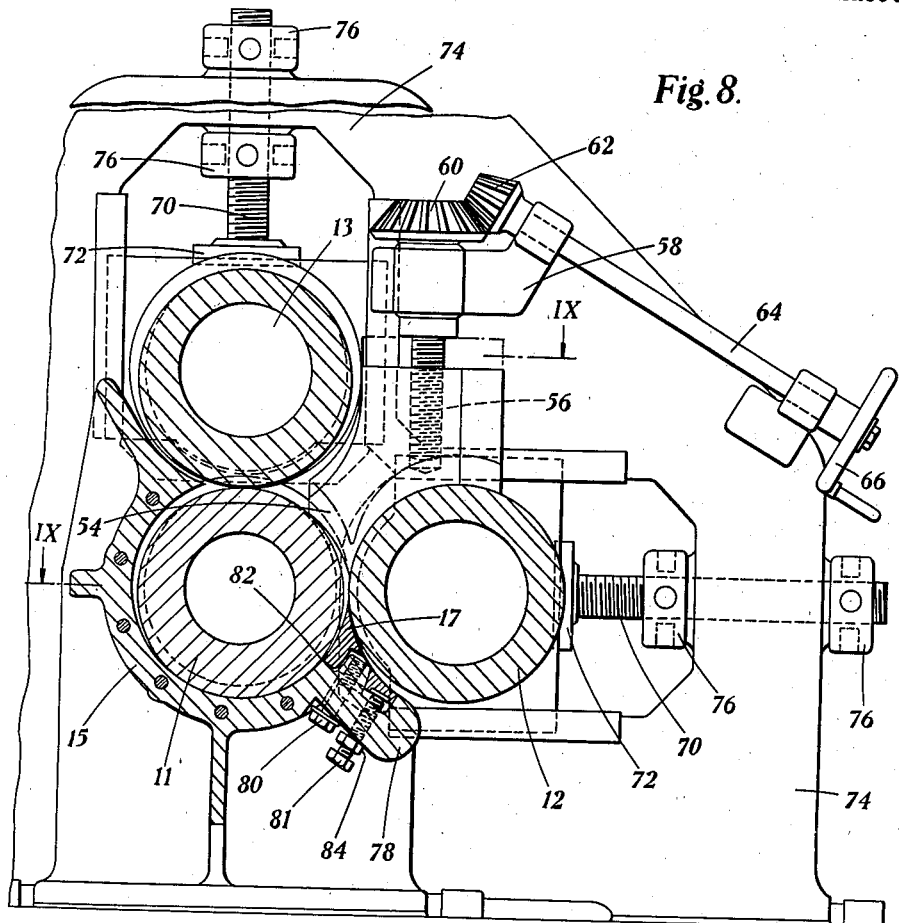

Nov. 25, 1941.    F. E. BROWN    2,264,237
MACHINE FOR WORKING RUBBER OR THE LIKE
Filed Jan. 29, 1941    8 Sheets-Sheet 1
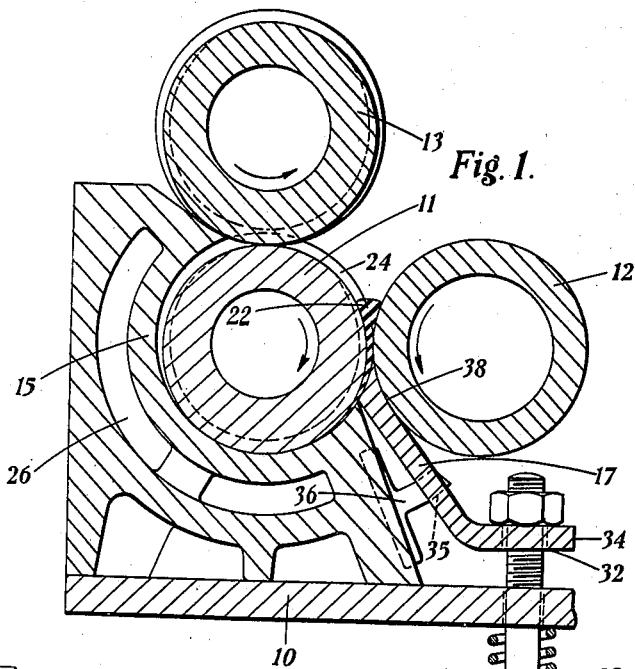
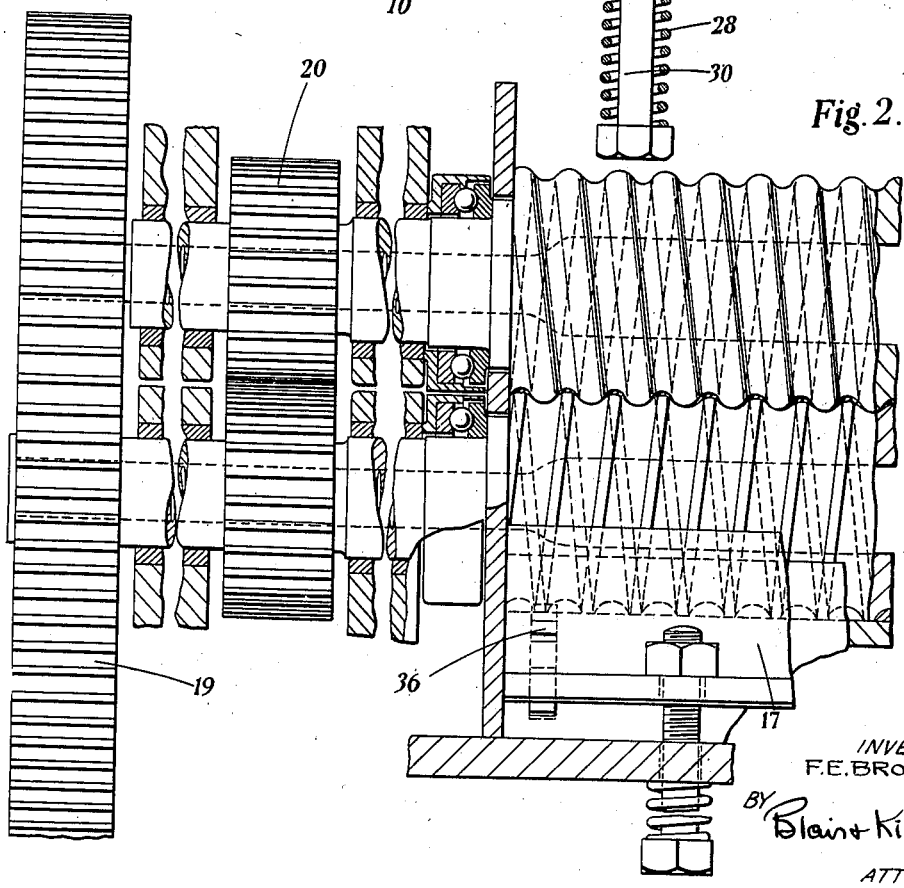
INVENTOR
F.E.BROWN
BY Blain + Kilcoyne
ATTORNEYS Nov. 25, 1941.                F. E. BROWN                    2,264,237
                   MACHINE FOR WORKING RUBBER OR THE LIKE
                         Filed Jan. 29, 1941          8 Sheets-Sheet 2
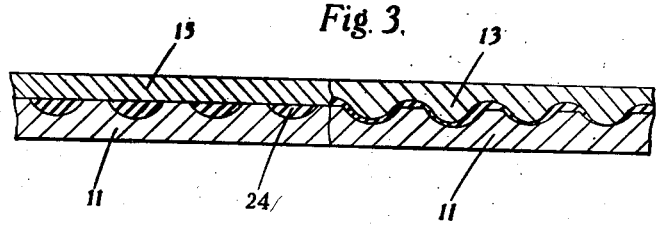
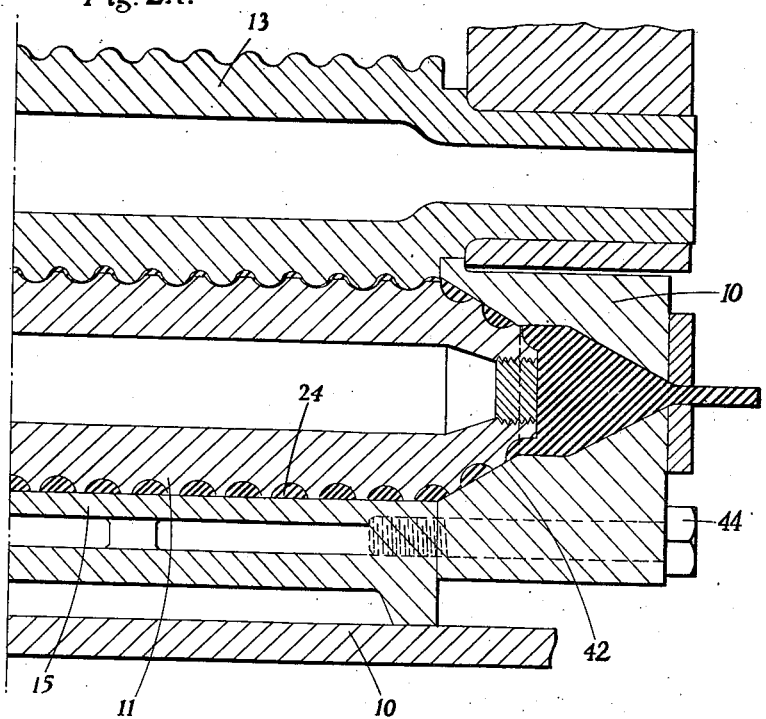
INVENTOR
F.E. BROWN
BY Blair + Kilcoyne
ATTORNEYS

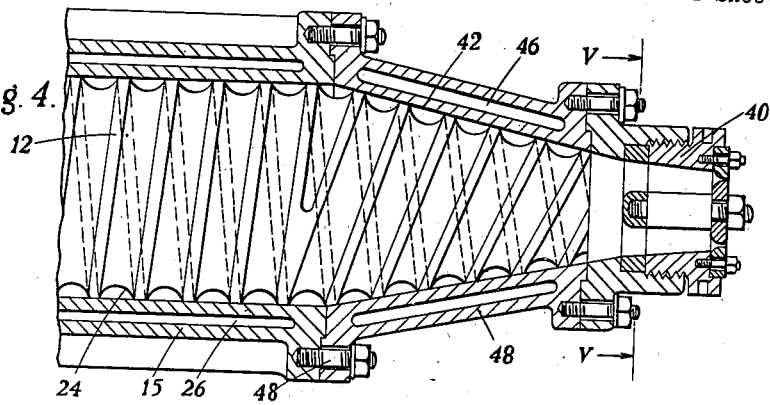
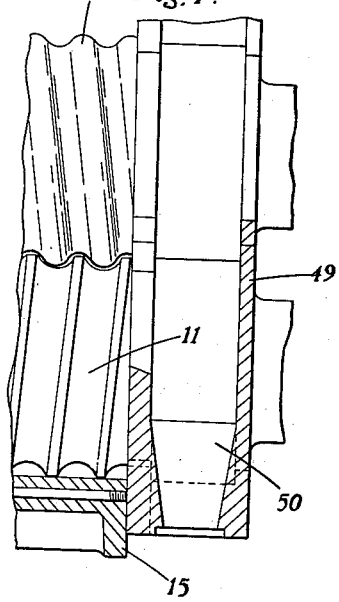
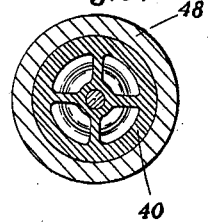
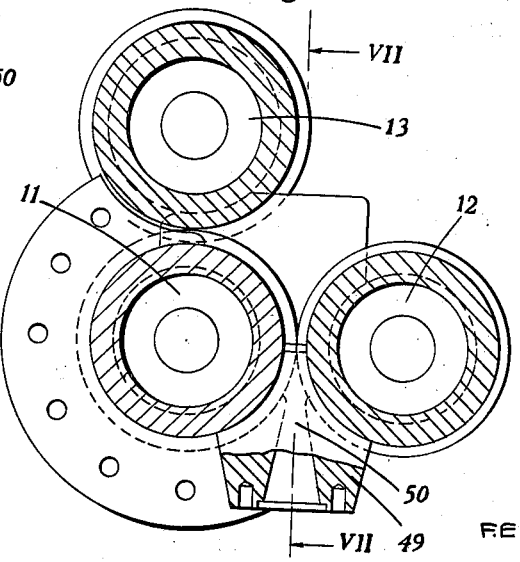

Nov. 25, 1941.  F. E. BROWN  2,264,237
MACHINE FOR WORKING RUBBER OR THE LIKE
Filed Jan. 29, 1941  8 Sheets-Sheet 4

INVENTOR
F.E. BROWN
BY Blair + Kilcoyne
ATTORNEYS

Nov. 25, 1941.    F. E. BROWN    2,264,237
MACHINE FOR WORKING RUBBER OR THE LIKE
Filed Jan. 29, 1941    8 Sheets-Sheet 6

INVENTOR
F. E. BROWN
BY Blair + Kilcoyne
ATTORNEYS

Nov. 25, 1941.  F. E. BROWN  2,264,237
MACHINE FOR WORKING RUBBER OR THE LIKE
Filed Jan. 29, 1941  8 Sheets-Sheet 7

INVENTOR
F. E. BROWN
BY Blair + Kilcoyne
ATTORNEYS

Patented Nov. 25, 1941

2,264,237

UNITED STATES PATENT OFFICE 2,264,237

MACHINE FOR WORKING RUBBER OR THE LIKE

Frederick Edward Brown, Hyde, England

Application January 29, 1941, Serial No. 376,543
In Great Britain November 9, 1939

19 Claims. (Cl. 18—2)

This invention relates to the working of rubber. The term "rubber" is to be considered as defining both natural and artificial rubber and any other material having the same physical characteristics.

The "working," "masticating" or "plasticising" of rubber is usually carried out in a so-called "two-roll mill" which consists of a pair of plain metal rollers arranged horizontally and pressed strongly into contact with each other. The rubber is worked by being passed repeatedly through the nip formed by the two rollers. At the beginning of the operation, the rubber is stringy and it will not lap round the rollers. When presented to the nip, it just passes between the rollers and an attendant has to pick it up and present it time and again to the nip. The rubber gradually becomes more plastic and after a time, the attendant succeeds in making it lap round one of the rollers so that rubber is constantly passing through the nip. Even when this stage is reached, however, the services of the attendant are still required because it is only when the working is nearing completion that the rubber forms anything like a homogeneous carpet. Holes develop in it; there are thick and thin places; some of the rubber may tend to adhere to the pressing roller; the rubber piles up in the nip to form a stationary "bank." These things, unless attended to, cause the lap to be broken and the repeated passage of the rubber through the nip to stop. The attendant is fully occupied throughout the working operation. He has a knife with which he makes slanting cuts in the lap and at frequent intervals he doubles the loosely hanging rubber over on to itself. This, repeated many times, finally produces a lap of homogeneous, fully worked rubber which can be cut off the roller and be subjected to further treatment elsewhere.

The two-roll mill is, of course, a batch machine, that is to say, it is a machine which brings the whole of a batch of rubber fed to it to a particular state before a new batch can be fed to it.

It is usual to add vulcanizing agents and accelerators such as sulphur and zinc oxide while the rubber is being worked.

Powdered ingredients such as pigments, fillers and the like frequently have to be incorporated into rubber. It is not feasible to add these ingredients to the rubber while it is being worked in the two-roll mill. The mixing of these ingredients is effected in a separate machine generally similar to the working machine. This machine has two horizontal rollers and the rubber is caused to lap continuously round one of them. The addition of the powders is effected by hand. The attendant distributes these along the nip, a small amount at a time. To ensure the even distribution of the powders through the rubber he resorts to the same expedient as during the working of the rubber, that is to say, he makes slanting cuts in the rubber and doubles the rubber over on the roller round which it is lapped. The mixing process is a slow and laborious one and the uniform distribution of the powders depends upon the efforts of the operator.

Working and mixing can be effected simultaneously by the use of the so-called "internal mixer" which is a machine comprising a pair of rotors totally enclosed in a casing. This is, again, a batch machine and it suffers from a number of disadvantages. Thus, it is a costly machine to manufacture. It works on large batches of rubber and the whole of the batch is acted upon from the start so that the peak load is very high indeed. In order to obtain adequate mastication, a temperature as high as 320° F. has to be maintained. The usual vulcanizing agents cannot be added at this temperature and, therefore, a separate, subsequent operation is required. Much time is lost when batches of different coloured materials have to be produced because of the necessity of and the difficulty in thoroughly cleaning the machine. On the other hand, its use shows a saving in time and labour over that required by the two-roll mill and it is capable of producing in bulk quite cheaply.

The two methods of procedure commonly used thus both suffer from the disadvantage that the working and mixing operations necessitate the use of two separate machines. Also, there is room for improvement in the amount of time and labour involved in practicing these methods.

The machine in accordance with the invention fulfils a long-felt want. It enables rubber to be worked much more rapidly and more thoroughly than do the existing machines; it calls for the use of a minimum amount of manual labour; it can be used either for working rubber or for incorporating powders into the rubber and ensures a most thorough distribution of the powders. Moreover, it allows the working and the mixing (both of vulcanizing agents and accelerators and of pigments and fillers) to be carried out as a single operation. Finally, it can be built to operate either continuously or as a batch machine and indeed, can be built so that one can switch over from one kind of operation to the other.

The machine in accordance with the invention resembles the two roll mill in that it has a pair of rollers between which the rubber is passed and round one of which the rubber is lapped. The latter roller will be referred to as the working roller and the other as the feed roller. A characteristic feature of the machine in accordance with the invention is that a space bounded by the working roller and a stationary surface is provided through which the rubber is forced when it has passed the nip of the working and feed rollers so that a substantial amount of working occurs by friction between the rubber and the stationary surface. The stationary surface surrounds a substantial part but not the whole of the working roller. It extends from near the nip of the working and feed rollers to above the level of the axis of the working roller and thus leaves the rubber free to form a bank above the feed nip. The lack of restraint on the rubber forming this bank and the restraint imposed upon the rubber when it has passed the feed nip are found to produce a very pronounced working effect indeed. If the stationary surface is extended to reach a point close to the feed nip, this beneficial effect is lost. A further characteristic feature of the invention is the provision of means for guiding the rubber which comes from the nip into the working space and for preventing the rubber from lapping round the feed roller.

In the simplest form of machine in accordance with the invention, the working and feed rollers have plain surfaces, and they are set with their axes in substantially the same horizontal plane. The working roller is arranged at the back and is partially surrounded by a casing which extends from a point a little beneath the nip to a point well above the level of the axis of the working roller. At its forward end, the casing either itself forms, or is provided with, an extension which forms a scraper blade the edge of which is just in contact with the surface of the feed roller. The rollers are rotated so that the rubber which is fed from above into the nip passes downwards through the rollers. When the rubber reaches the scraper, it is guided by this into the space between the casing and the working roller and is prevented by the scraper from lapping round the feed roller. The casing extends far enough round the working roller to ensure that the rubber will proceed again to the nip without falling off that roller, but does not proceed as far as the neighbourhood of the nip. It can for example, extend to a point directly above the axis of the working roller so that the latter roller is free over the upper, forward quarter of its circumference. Means are provided for allowing the pressure between the two rollers to be varied. In using such a machine, the rubber to be worked would be fed in a little at a time until the whole batch had been introduced. The laborious process of cutting the rubber on the working roller and doubling it over which was described in connection with the two-roll mill is eliminated because of the support offered by the casing. The rubber is soon running smoothly and the vulcanising agents and accelerators can be added. The rubber, has of course, to be kept in the machine for some time before it is fully worked. If fillers and pigments are to be added, it is not necessary to await the completion of the working. They can be added very shortly after the batch of rubber has been received into the machine. When they are added, the rollers have to be separated to the extent required to enable the increased volume of material in the mill to be accommodated. That, however, is the only adjustment which has to be made.

It will be readily seen that the conversion of an existing two-roll mill to a machine in accordance with the invention is quite a simple matter.

Although the two-roller machine described briefly above can be used to give quite good results, it has been found that the best results are obtained when a third roller is provided. This roller is pressed against the working roller to form a nip through which the rubber passes after it has passed through the nip formed by the feed roller and the working roller and through the space defined by the working roller and the casing. This third roller will be referred to as the delivery roller. Another feature which increases the efficiency and effectiveness of the machine to a very material extent, is the provision of intermeshing ribs and grooves in the working and delivery rollers. The preferred form of the machine in accordance with the invention has these features and is designed so that it can operate as a continuous machine or as a batch machine.

It can be briefly described as follows.

The working and feed rollers are substantially as described above, except that the working roller is provided with a substantially helical groove which runs from one end to the other. The delivery roller is arranged above the working roller with its axis in the same vertical plane as that of the working roller. It is provided with a helical groove corresponding to that in the working roller, but of opposite hand. The casing extends round the working roller to a point quite close to the nip formed by the working and delivery rollers.

To enable efficient mastication and mixing to be obtained, the grooves in the working and delivery rollers are not a close fit. When the rubber passes through the nip formed by the delivery and working rollers, it is therefore, forced sideways out of the grooves in the working roller. When the rubber has passed through that nip and arrives at the nip formed by the working and feed rollers, it piles up slightly to form a bank, and, in passing through the feed nip, is turned over and over on itself. It is important to note that the rubber which thus forms a bank just above the feed nip is not restrained as is that which passes the feed nip. It is this absence of restraint which allows the rubber to turn over and over on itself, an action which is ensured by the machine. The working space between the working roller and the casing is formed by the grooves in that roller and the rubber is subjected to a considerable amount of working as it proceeds to the delivery nip. It will be seen, therefore, that the rubber is being worked to a substantial extent while it is passing round by far the greater part of the working roller, and, moreover, that it is subjected to a number of different kinds of working. This makes for uniformity of the finally produced material and ensures that the rubber will be brought to the desired state in a relatively short time.

The friction between the rubber and the casing has a braking effect on the rubber and, the groove in the working roller being helical, the rubber is therefore caused to move as a whole axially along the working roller. The rubber is thus subjected to yet another kind of working. Further, the rubber will, in these circumstances, be continuously delivered at the far end of the working roller. The rate at which it is delivered can, of course, be controlled by means which offer resistance to its leaving the machine, and therefore it is possible to ensure that there will be a continuous delivery of rubber which has been worked to the required extent. If desired, the worked rubber can be continuously produced as a strip or rod or tube of particular cross-section by the provision at the delivery end of the machine of an extruding head. The provision of such an extruding head directly on a continuous machine for working or mixing rubber is in itself a novelty.

The thoroughness with which the rubber is worked enables powdered ingredients to be incorporated uniformly into the rubber in the same machine and while the rubber is being worked. This again is a novelty of considerable importance, because, as previously explained, the usual method is first of all to work the rubber in one machine and then to add the powders to it in another machine. In a two-roll batch machine according to the invention, the rollers have to be separated when the powders are added because of the increased volume being dealt with. In the continuous three-roll mill however, it is not necessary to separate the rollers.

The only attention which the machine requires is to see that a supply of rubber and of any powders which are to be added is maintained which will maintain the required rate of delivery of worked rubber. Once a machine has been set the amount of attention it requires is, therefore, very small indeed. Mechanical means can, of course, be provided for supplying the machine at the desired rate.

Where the machine is to operate as a batch machine, it is only necessary to close the delivery orifice. The working operation is then slowed up to some extent because there is not the same amount of movement between the rubber and the casing. When the rubber has been sufficiently worked it can be removed by simply opening the discharge orifice. This removal can be assisted by the action of a scraper which is engaged at the appropriate time in the groove in the working roller near the feed end and which is caused to follow that groove to the discharge end. Alternatively, a scraper or knife can be brought into contact with the full length of face of the working roller above the feed nip so as to cut through the rubber and allow it to come off in the form of a sheet.

When the machine is designed to operate purely as a batch machine, it can be provided with rollers which are grooved in such a way as to ensure that the rubber is moved axially relatively to the casing and so that it is, therefore, worked at the same rate and to the same extent as in the continuously operating machine described above. Examples of such grooves will be given in detail further on.

In order that the invention may be thoroughly understood and be more readily carried into effect, some examples of machines in accordance with the invention will now be described with reference to the accompanying drawings, in which—

Figure 9:
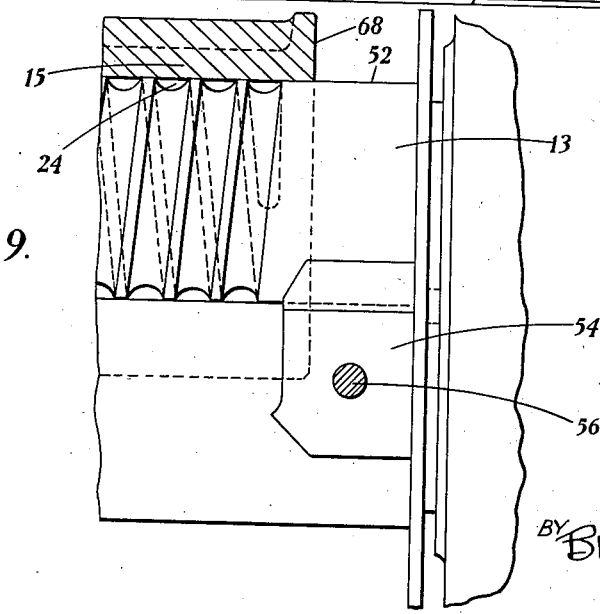
Figure 10:
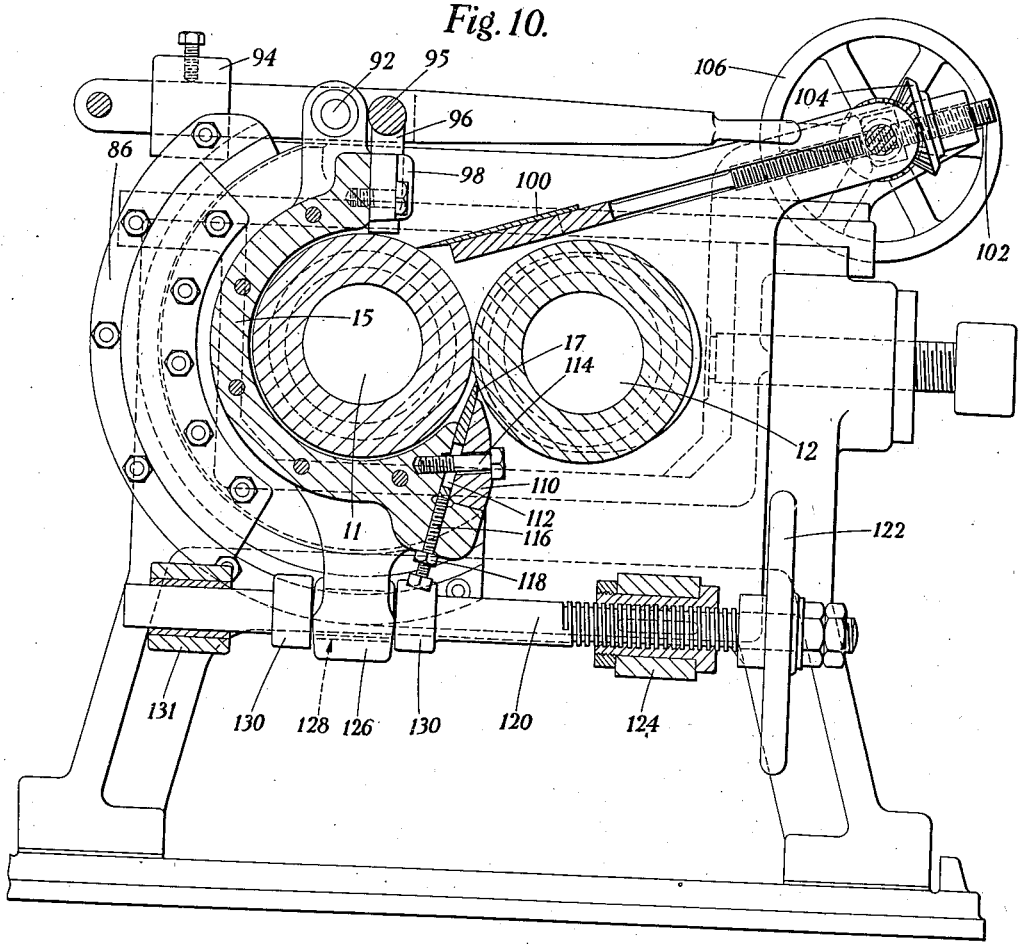
Figure 11:
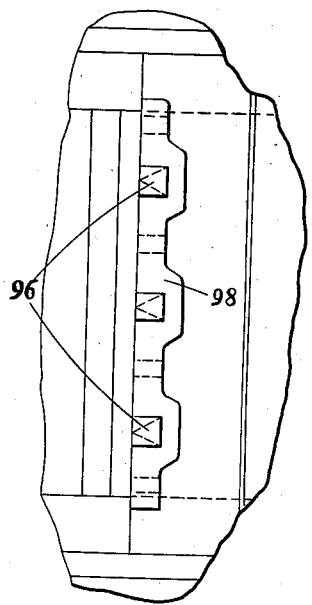
Figure 12:
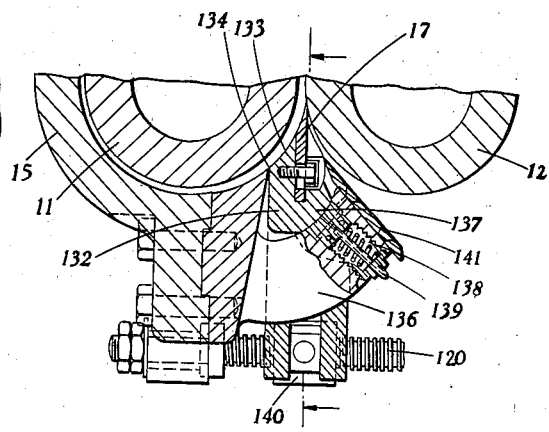
Figure 13:
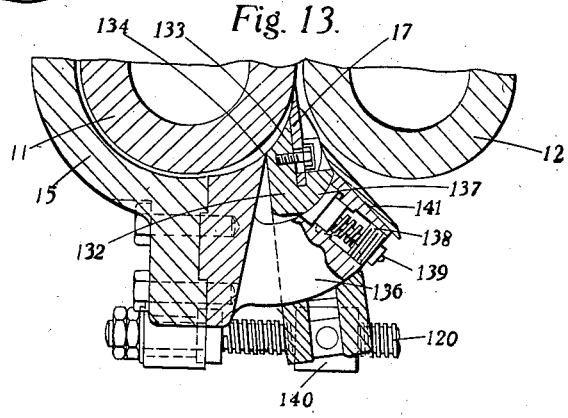
Figure 14:
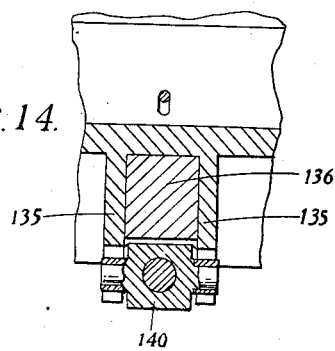
Figure 15:
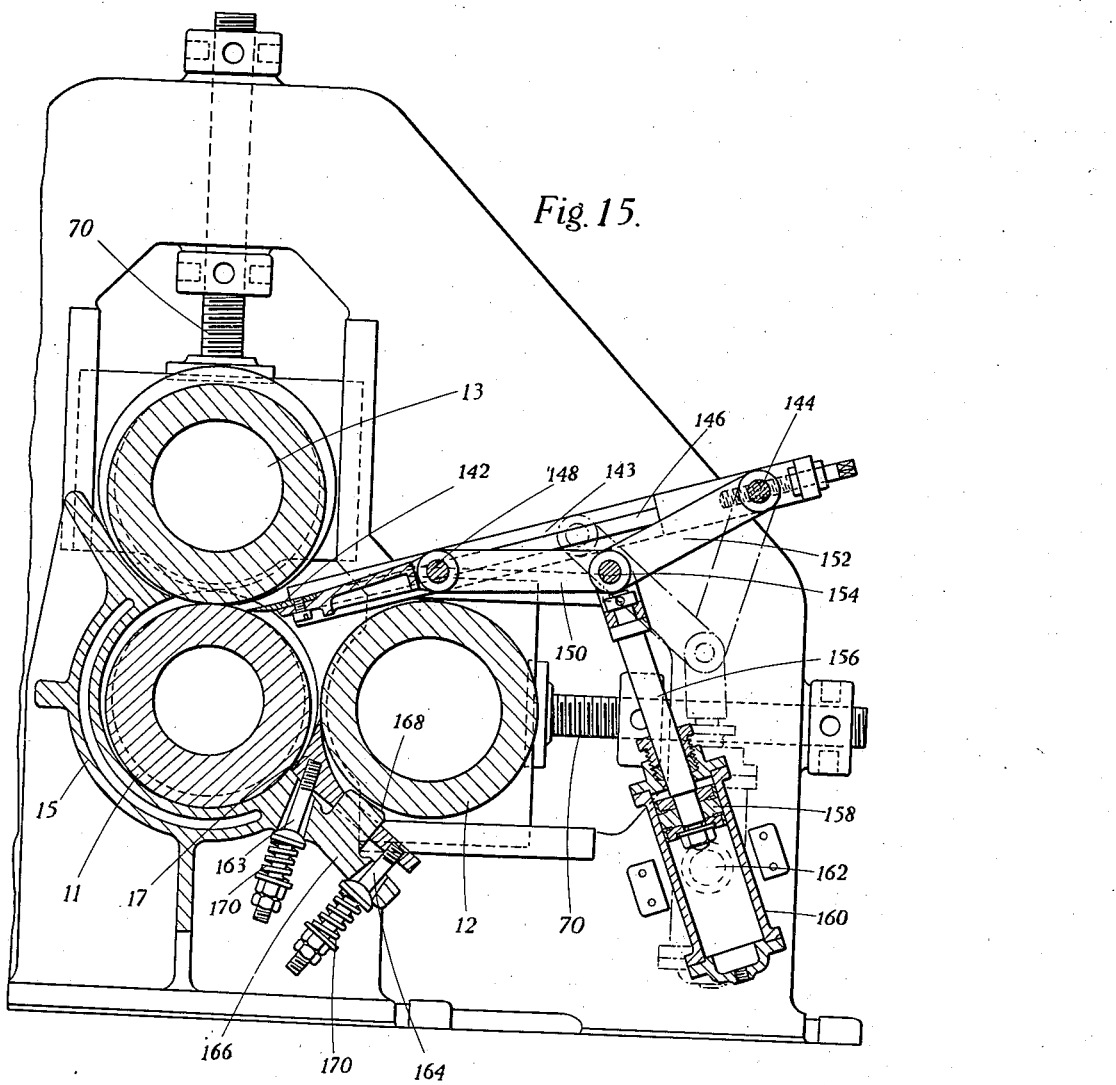

Fig. 1 is a cross-section through a machine in accordance with the invention in which only essential parts of the machine are shown, Fig. 2 is a front elevation partly in section of the machine shown in Figure 1 with the feed roller removed and showing the driving gears for the rollers and an extruding head through which the worked rubber is delivered, Fig. 3 is a fragmentary diagrammatic view to a larger scale showing the shape of the ribs and grooves on the working and delivery rollers and illustrating how the rubber is worked, Fig. 4 shows an alternative form of extruding head to that shown in Fig. 2 and a modification of the design of the delivery end of the working roller, Fig. 5 is a section on the line V—V in Fig. 4, Fig. 6 is a cross-section through yet another kind of extruding head, Fig. 7 is an elevation partly in section of the arrangement shown in Fig. 6 but with the feed roller removed, Fig. 8 is a cross-section through a machine which can be operated either as a continuous machine or as a batch machine, Fig. 9 is a sectional plan view of Fig. 8 taken on the line IX—IX in Fig. 8, Fig. 10 is a cross-section through a batch machine corresponding to Fig. 8 but showing various modifications, Fig. 11 is a plan view of part of Fig. 10, Figs. 12 and 13 show in two different working positions an arrangement which allows a scraper of the kind of that shown in Fig. 10 to be used also for stripping the worked rubber off the working roller, Fig. 14 is a section taken on the line XIV—XIV in Fig. 12, Fig. 15 is a cross-section through a batch machine showing further modifications, and Figs. 16–19 show different forms of working rollers which can be used.

The machine shown in Figs. 1 and 2 has a bed plate 10 on which are supported for rotation three rollers 11, 12, 13. The bed plate 10 also supports a casing 15 which fits the roller 11 over more than half its circumference. It also carries a scraper 17 which is resiliently pressed against the roller 12 and which forms an extension of the casing 15.

The roller 11 will be referred to as the working roller, the roller 12 as the feed roller and the roller 13 as the delivery roller. The roller 11 is driven through the gear wheel 19 and drives the roller 13 through the gearing 20 (Fig. 2) and the roller 12 through gearing not shown. The rollers are driven in the sense of the arrows shown in Fig. 1. The rollers 12 and 13 are strongly pressed against the working roller 11 by means not shown here. Suitable means are shown in other figures of the drawings which will be described further on.

The rubber 22 to be worked is fed to the nip of the working and feed rollers 11 and 12 at the left hand or driving end of the machine and passes through this nip into the space between the scraper 17 and the working roller, between the working roller and the casing 15, through the nip of the working and delivery rollers 11 and 13 and once again to the feed nip. The scraper 17 prevents lapping of the rubber round the feed roller and guides the rubber so as to ensure that it will pass between the working roller and the casing.

The feed roller 12 has a plain surface. The working and delivery rollers 11 and 13 are provided with helical grooves and ribs which intermesh as shown in Figs. 2 and 3.

When the rubber is fed into the nip formed by the feed and working rollers, it is gradually pulled through that nip by the rotation of the rollers. It is then forced into the space between the working roller and the casing 15. This space is provided by the groove 24 in the working roller. The rubber thus fills this groove which is closed by the casing 15 as shown diagrammatically in the left hand part of Figure 3. In actual fact, whatever the pressure may be between the roller 11 and the casing 15, the rubber will extend continuously from one convolution of the groove to the next over the rib separating these convolutions. As the roller rotates and the casing is stationary, the rubber will be braked and will not move round as fast as the roller 11. The consequences of this are that there is relative circumferential movement between the rubber and the roller 11 on the one hand and the rubber and the casing on the other and there will also be relative movement of the rubber as a whole towards the right hand end (Figure 2) of the roller. The rubber, in effect, acts as would a nut which is held against rotation while the screw within it is caused to rotate. The three-fold movement of the rubber relatively to the parts which bound the space in which it is enclosed, causes the rubber to be worked to a very considerable extent while it is passing to the nip formed by the delivery roller 13 with the working roller. When the rubber arrives at that nip, it is forced out of the groove in the working roller by the rib on the delivery roller. It will be seen from the right hand part of Figure 3 that the rib and groove in the delivery roller have not the same shape as the rib and groove in the working roller. The groove in the working roller is more shallow than that in the delivery roller. There is no complete inter-meshing of the ribs and grooves, but it will be noticed that the rib on the delivery roller is pressed into contact with the base of the groove in the working roller. The rubber is, therefore, forced out of the groove in the working roller into the space which exists between the rib on the working roller and the groove in the delivery roller. Once again, it is to be noted that however great the pressure may be between these two rollers there will always be a film of rubber between the parts which are pressed together.

When expelled from the groove in the working roller, the rubber moves sideways in both directions at right angles to its general direction of movement determined by the working roller. Once again, therefore, it is subjected to quite a drastic working effect.

It is to be noted also that there is a difference in the linear speeds of opposite points in the surfaces of the two rollers. There will also, therefore, be relative circumferential movement between the rubber and the two rollers which, of course, also helps to work the rubber.

The distance between the nip formed by the delivery roller and the working roller and that formed by the feed roller and the working roller is relatively short, and it is only over this short distance that it can be said that the rubber is not being worked. This free space is, however, of considerable importance because it allows the rubber to form a slight bank immediately above the nip of the feed and working rollers, as shown in Figure 1. It has been observed in practice, that the rubber in this bank rolls over and over, on itself, and it is quite clear that considerable working is taking place here. This bank could not be formed if the casing 15 or an equivalent part were arranged to continue as far as or near to the nip of the feed and working rollers.

It is obvious, of course, that quite a large amount of heat will be produced by the friction of the rubber on the various parts, and in order that any excessive amount of heat may be dissipated adequately, the casing 15 is cored as shown at 26 in Figure 1 to provide a cooling jacket through which water may be circulated. It can sometimes happen that a certain amount of heat is required at the start to accelerate the plasticising of the rubber. In that case hot water or steam can be circulated through the jacket 26, a suitable two-way connection being provided to enable one to switch over the circulation at any instant.

It is very important that the feed roller 12 should be kept clean and that the rubber should not lap round it. This is ensured by the provision of the scraper 17 which runs the length of the roller 12 and is pressed against it near each end by means of a spring 28. Each spring is mounted between the head of a bolt 30 and the base plate 10. The bolts 30 pass through elongated holes 32 in the bent end 34 of the scraper and the scraper is provided near each end with a hole 35 through which passes a curved lug 36 projecting forwardly from the casing 15. At its upper end 38, the scraper is curved so as to fit the roller 12. It will be seen that this form of mounting allows the scraper to maintain an appropriate position relatively to the roller 12 even when the roller 12 and the scraper have become worn. It adjusts itself always automatically to the desired position.

As is clear from what has been said above, the rubber travels progressively towards the right hand or delivery end of the machine (Figure 2). At this end, the working roller 11 is supported in an extruding head 40. The end of the roller is tapered as shown at 42, but the groove in it extends right to the end of the tapered portion. The head 40 is attached to the end of the casing 15 by means of screws 44.

The extruding head shown here is suitable for the production of rodding, which can be of any desired cross-section. The worked rubber is delivered continuously from the working roller and is forced through the extruding head which thus delivers continuously the finally desired product.

As has been previously stated, it is usual, when powdered ingredients have to be incorporated into the rubber, to plasticise the rubber first of all in one machine and then to mix in the ingredients in another. In each case it is a question of batch operation. It is found, however, that the machine which has been described above forms a very efficient mixing machine which enables powdered ingredients to be mixed with the rubber at the same time that the rubber is being worked. Where powders have to be mixed in, they are supplied to the nip formed by the feed and working rollers near the left hand end of the machine, and it is found that extraordinarily large quantities of powders can be incorporated and be distributed throughout the rubber in a much more uniform manner than is the case in the normal mixing machine. This can be done without slowing up the rate of production of properly worked and plasticised rubber.

It will be observed that the space at the front of the machine between the feed and delivery rollers, and which extends throughout the whole length of the rollers, allows the progress of the operations which are being carried out in the machine to be observed very easily. The condition of the rubber can be seen at a glance at any point along the length of the rollers. This is a very big advantage, particularly where the machine is being used as a mixer.

Figures 4 and 5 show the delivery end of a working roller provided with a different kind of extruding head 40. This head is suitable for the production of a tube. As before, the delivery end of the working roller is tapered, but there is an improvement here which consists in branching the helical groove 24 at the beginning of the tapered portion so that it continues over that portion as two helices of steeper pitch. The groove is of the same size throughout. This arrangement has the advantage over that shown in Fig. 2 that the "capacity" of the working roller is not substantially reduced over the tapered portion and, therefore, the tapering of the end of the roller will not slow up the delivery of the rubber. The same result can be obtained by altering the pitch or the size or both the pitch and the size of the groove. It will also be observed there that the tapered end 42 of the working roller is surrounded by a water jacket 46 formed in a casing 48 which is attached to the casing 15 by means of studs 50.

Figures 6 and 7 show an arrangement of the delivery end of a machine in accordance with the invention in which the worked rubber is delivered downwards instead of axially. Here, the working and feed rollers are not tapered at the delivery end. The casing 15 has an attachment 49 which forms a chamber 50 into which the rubber is delivered from the nip of the rollers 11 and 12. An extruding head can be fitted to the lower end of the attachment 49 to allow a product having any desired cross section to be delivered.

Figures 8 and 9 show an arrangement which has been specially designed so as to be operated as a batch machine.

The machine has, as in the previous cases, three rollers 11, 12 and 13 and a casing 15 defining with the working roller 11 a space through which the rubber is forced on its way from the feed nip to the delivery nip. The rollers 11 and 13 have helical grooves 24 in them as described above but the grooves do not continue right to the ends of the rollers. The ends of the rollers are plain as is shown at 52 in the case of the delivery roller 13 in Figure 9. The plain ends of the rollers project beyond the end of the casing 15.

At the delivery end there is a block 54 which forms a stop to prevent the rubber from being fed axially beyond the end of the rollers by the helical grooves therein. This stop can be lowered into the nip of the working and feed rollers as shown in full lines in Figure 8, and be lifted into the position shown dotted in that figure. For lifting and lowering it, it is provided with a screw-threaded rod 56 which is supported in a bearing in a fixed bracket 58. The end of the rod 56 is provided beyond the bracket with a bevel wheel 60. This bevel wheel meshes with a bevel wheel 62 on the end of a spindle 64 which also passes through the bracket 58. The spindle 64 is provided with a hand wheel 66. When this hand wheel is turned, the screw-threaded rod 56 is turned in the block 54 and the latter is raised or lowered in accordance with the direction in which the handle is turned.

When the rubber is being worked, the block 54 is in its lowest position. The block is shaped so as to fit closely against the plain ends 52 of the rollers 11 and 12 and the rubber is therefore prevented from being delivered out of the machine. When the rubber has been worked to the desired extent, the block 54 is lifted and the rubber is moved axially onto the plain part 52 of the working roller. It can be removed as a continuous strip from this plain part by being cut close to the end face 58 of the casing 15.

Figure 8 also shows means which are provided for pressing the feed and the delivery rollers against the working roller. These means can be used in the arrangements shown in the other figures of the drawings. In each case, they consist of a screw 70 which terminates in a pressing block 72 bearing against the roller which is being acted upon. The screw passes through the frame 74 of the machine and is provided on either side of the frame with lock-nuts 76 which can be adjusted by means of a key to cause pressure to be applied to the rollers and to lock the screw in any desired position. The arrangement of screws shown is of course duplicated at each end of the machine.

Figure 8 also shows an alternative method of mounting the scraper 17 which prevents the rubber from lapping round the feed roller. This arrangement can be adopted in the case of the previously described figures. Here, the casing 15 is provided at each end with lugs 78 and the scraper is adjusted by means of two screws 80 and 81 which pass through this lug. The screw 80 passes freely through the lug and is screwed into the lug 78 and bears against the scraper. The scraper is arranged to pivot about its rearmost edge 52 when the screws 80 and 81 are turned. The screw 81 is provided with a lock nut 84 to enable the scraper to be held firmly in any adjusted position.

Figures 10 and 11 show an adaptation of the ordinary two-roll mill to form a batch machine in accordance with the invention. The machine has only two rollers, namely a working roller 11 and a feed roller 12. In the usual two-roll mill, the working roller has a plain surface but here its surface is grooved. The feed roller has a plain surface. The working roller is surrounded by a casing 15 which defines with the roller a space through which the rubber is forced after it has passed the nip formed with the feed roller. No such casing is present in the usual two-roll mill. The casing 15 extends further round the working roller than in the cases previously described and it is mounted so that it can be turned through a small angle round the working roller. For this purpose, it is mounted to slide in a fixed casing 86. The object of this will be explained further on.

The machine, as already stated, works as a batch machine, that is to say, a charge or batch of rubber is fed to it and the rubber is repeatedly passed through the feed nip until it is in the desired condition.

In order to assist the working of the rubber, means are provided for cutting it on the working roller after it leaves the casing 15 and before it reaches the feed nip. For this purpose, two levers 90 are provided, one near each end of the machine. (Only one is shown here.) Each lever is pivotally mounted on the casing 15 at 92 and carries a counterweight 94 which, during the normal operation of the machine, holds the forward end of the lever in a raised position, that is to say, out of the position shown in Figure 10. A little in front of the pivots 92, the levers carry a rod 95 from which depend a series of cutters 96 which pass through guide slots in an extension 98 of the casing 15.

At intervals, the attendant presses on the forward end of one of the levers so as to bring it into the position shown in Figure 10. This brings the cutters 96 into contact with the rubber on the working roller. As is shown in Figure 11, these cutters are wedge shaped, so that in addition to cutting through the rubber they move the rubber sideways on either side of the cut so as to increase its thickness locally. The working of the rubber, when it is passed in this condition through the feed nip is increased, largely because the rubber is caused to turn over on itself when it goes through the feed nip.

When the rubber has been sufficiently worked it has, of course, to be removed from the working roller. To enable it to be so removed, a knife 100 is provided. This knife is carried by a screw-threaded rod 102 connected by bevel gearing 104 to a hand wheel 106. Operation of this hand wheel brings the cutting edge of the scraper into contact with the rubber which is on the free part of the working roller. This cutting edge conforms to the shape of the working roller, and by cutting right through the rubber causes the rubber to be removed from the working roller as a sheet.

The scraper 17 which is provided for preventing lapping round the feed roller is in the form of a flat plate which is held between the lower end of the casing 15 and a block 110.

The scraper has a slot 112 in it providing generous clearance for a screw 114 which passes through the block 110 and is screwed into the casing 15. A screw 116 is provided which is screwed into the casing 15 in line with the scraper 17. By being screwed further into the casing, the screw 116 pushes the scraper 17 further towards the feed roller 12. When the scraper is in the desired position, the screw 116 is locked by means of the nut 118 and the scraper is held firmly in position by being tightened between the casing and the block 110 by means of the screw 114.

When the machine is being used purely as a working or masticating machine, the working and feed rollers are pressed tightly into contact with each other. This is done by means of the screw 70 which operates in the same way as the screws 70 described in connection with Figure 8. When bulky ingredients have to be added to the worked rubber, a gap must be provided between the rollers to increase the capacity of the machine. Thus, if reclaim or similar material is to be added to the worked rubber, the gap may be adjusted to say ⅛ or 3/16 inch. When the rubber is running smoothly, powdered accelerators, vulcanising agents, pigments and so on may be added. The gap must again be widened, for example to 1/16 to ⅜ inch.

When the gap is adjusted, the scraper 17 must be adjusted accordingly and it is to enable this to be done rapidly and simply that the casing 15 is mounted for rotation as described above. It will be seen that a screw-threaded rod 120 provided at its outer end with a hand-wheel 122 is arranged at the bottom of the machine. This rod passes through a fixed nut 124, and through a lug 126 on the casing 15. There is a generous clearance between the rod and the hole 128 in the lug through which it passes. The rod has a collar 130 fixed to it on either side of the lug 126 and its inner end is supported in a bearing 131. By turning the handwheel, one or the other of the collars 130 is caused to bear against the lug 126 and to turn the casing, thus bringing the scraper 17 towards or away from the feed roller 12.

The arrangement shown in Figures 12–14 can be considered to be a fragmentary part of the machine shown in Figure 10, but with a modified form of scraper. Corresponding parts have been given corresponding reference numerals. The scraper 17 is here of the same general form as that shown in Figure 10. It is shown in Figure 12 in the normal working position and is shown in Figure 13 in a position into which it can be moved in order to strip the rubber from the working roller 11. It will be seen that the scraper is adjustably mounted on a carrier 132, the upper surface 133 of which forms a continuation of the inner surface of the casing 15. The casing 15 and the carrier 132 have edges which abut at 134 about which the carrier can be pivotally moved. The lower end of the carrier 132 is forked and the two branches 135 of the fork embrace a curved lug 136 fixed to the casing 15. The upper surface 137 of the lug and the surface of the carrier 132 which bears on it are suitably curved so as to enable contact to be maintained when the carrier 132 is swung about the edge 134. A spring 138 is provided to maintain these two parts in contact and an oil hole 139 is provided to enable the surfaces 137 to be lubricated.

The outer ends of the prongs 135 embrace a nut 140 on a screw 120. The nut is prevented from turning by the fork and it is clear that rotation of the screw 120 will cause the carrier to swing about the edges 134.

Figure 12 shows the normal working position in which the scraper 17 is in contact with the feed roller 12 and as in the arrangement described above, serves the double purpose of guiding the rubber which is being worked into the space between the working roller 11 and the casing, and of preventing lapping of the rubber round the feed roller 12. Here the scraper serves yet a further purpose. It will be seen from Figure 13 that when the screw 120 is turned clockwise, the scraper 17 is brought up against the working roller 11. In being brought into this position, it will cut through the rubber on that roller and if held in that position (Figure 13) the rubber will be peeled off the working roller 11 and will be delivered as a sheet over the guide plate 141. It may be collected by hand by the operator, or it may be delivered into any conveniently disposed receptacle.

Another method of operation is to swing the scraper from the position shown in Figure 12 to that in Figure 13 and, as soon as the scraper 17 has cut through the rubber on the working roller, to swing it back again towards the position shown in Figure 12. If this is done, the sheet which starts to peel off the working roller will be caused to lap around the feed roller 12. The operator can then cut the sheet of rubber off the feed roller at his leisure.

It is clear that a lever arrangement could be used instead of the screw and nut arrangement 120, 124, and that the swinging into and out of the position shown in Figure 12 could be effected mechanically and automatically if desired. It will also be clear that the arrangement of the scraper to enable it to be used also for stripping the worked rubber could be applied to other forms of the machine in accordance with the invention which have been described here.

Figure 15 shows a power operated arrangement for removing the finished product from a batch machine. The machine, as in previous cases, has three rollers 11, 12, 13, a casing 15, a scraper 17, screws 70 for adjusting the pressure between the rollers and a take-off knife.

The take-off knife 142 is carried at the end of a rod 143 mounted to turn on a fixed pivot 144. The rod 143 has a slot 146 in it in which is engaged a pin 148 carried by one link 150 of a toggle the other link 152 of which is connected to the pivot 144. The links 150, 152 are pivotally mounted at 154 on the rod 156 of a plunger 158 arranged in a cylinder 160. The cylinder 160 is mounted to rock on a pivot 162.

The take-off knife 142 is shown in full lines in Fig. 12 in its operative position in which it bears against the working roller. In that position it will cause any rubber on the working roller to be peeled off as a sheet.

To bring the knife into its inoperative position in which it is clear of the working roller, the toggle 150, 152 has to be broken further into the position shown dotted in Fig. 12. This is done by exhausting the cylinder 160 beneath the plunger 158. By introducing fluid under pressure into the bottom of the cylinder, the knife can of course be brought back into the operative position. The plunger can be operated by air, steam or water.

Fig. 15 shows yet a further means for adjusting the scraper 17. Here, the scraper is carried by two screws 163, 164 which are screwed into it and pass with clearance through a lug 166 on the casing. It lies between side lugs 168 on the lug 166. The screws have springs 170 on them and it is clear that the scraper con be brought conveniently with its cutting edge in contact with the surface of the roller 12 by adjustment of the screws and that it is resiliently pressed against the roller so that it will automatically adjust itself when the roller or the scraper wears.

It has been mentioned in connection with Figure 1 that the intermeshing ribs and grooves in the rollers produce a working effect which results from the difference in linear speed of opposite points in the surfaces of the rollers. Such a difference of speed can be deliberately produced by the use of rollers of different diameters running at the same angular speed or the use of rollers of the same diameter running at different angular speeds. The ratio of the surface speeds may be as great as 1.5 or 1.6 to 1 when the machine is used as a mixer and as great as 2.5 to 1 when the machine is used for refining. Where the rollers are grooved, they must, of course, be specially designed to allow them to have different surface speeds and still engage without fouling. This is, of course, a matter which is within the competence of any engineer and needs no further explanation.

Figures 16 to 19 show different kinds of grooved working rollers which can be used.

Figure 16:
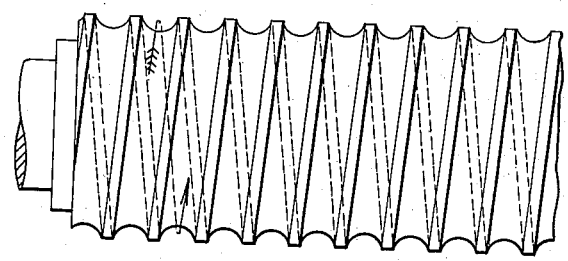

In Figure 16 there is a helical groove. When used in a machine having a casing or the like exerting a substantial retardation on the advance of the rubber, such a roller will cause the rubber to move continuously towards one end of the roller. It is therefore particularly suitable for use in a continuous machine. It can be used in a batch machine if means such as have been described are provided for stopping the continuous axial movement of the rubber.

Figure 17:
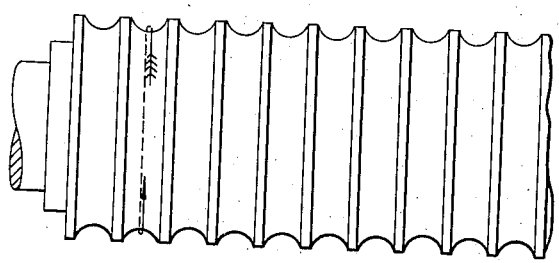

In Figure 17, there are circumferential grooves which lie in planes at right angles to that containing the axis of the roller. Such a roller can be used only in a batch machine.

Figure 18:
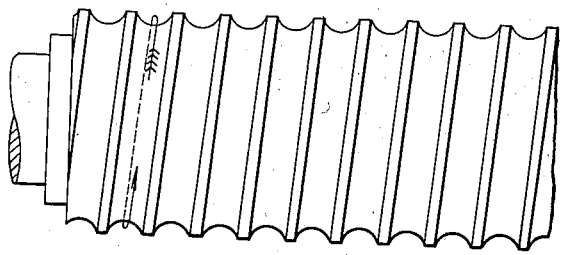

The working effect of the roller shown in Fig. 17 can be increased by the use of grooves such as are shown in Fig. 18 which lie in planes which make an angle with that containing the axis of that roller. The increased working effect is due to the fact that the rubber in the grooves has an axial movement relatively to any fixed surface which closely surrounds the roller in addition to its circumferential movement. The increase in working which is obtained depends, of course, on the slope of the grooves. The greater the slope, the greater the working.

Figure 19:
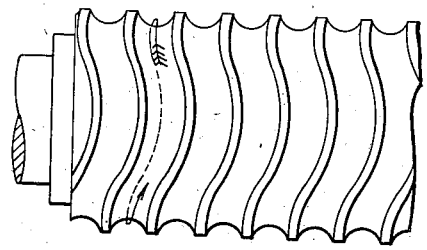

Another way of increasing the working effect is to use wavy grooves as shown in Fig. 19. The increased working effect follows from the same reasoning as has been used in connection with Fig. 18.

The machine in accordance with the invention can be made to work on large quantities of rubber. A good general purpose machine can have rollers 5 feet long and from 1 ft. 6 ins. to 2 ft. in diameter. The working roller is preferably rotated at from 10 to 12 R. P. M. and the feed roller at about 15 R. P. M.

Certain features herein shown and described, but not claimed, are contained in my copending application Serial No. 403,041, filed July 18, 1941.

I claim:

1. A rubber working machine comprising a working roller, a feed roller, means for pressing said rollers together so as to form a nip, means for rotating said rollers, means providing a stationary surface which surrounds a substantial part but not the whole of said working roller and extends from near the nip of said rollers to above the level of the axis of said working roller and defines with said working roller a space through which rubber which has passed the said nip can pass in contact with said surface and with the surface of said working roller and means for guiding said rubber into said space and for preventing it from lapping round said feed roller.

2. A rubber working machine comprising a working roller, a feed roller, a delivery roller, means for pressing said working and feed rollers together so as to form a "feed" nip, means for pressing said working and delivery rollers together so as to form a "delivery" nip, means for rotating said rollers, means providing a stationary surface which extends continuously from near said feed nip, beneath said working roller to above the level of the axis of said working roller and defines with said working roller a space through which rubber which has passed said feed nip can pass in contact with said surface and with the surface of said working roller and means for guiding said rubber into said space and for preventing it from lapping round said feed roller.

3. A rubber working machine as claimed in claim 1 in which said feed roller has a plain surface.

4. A rubber working machine as claimed in claim 2 in which said feed roller has a plain surface.

5. A rubber working machine as claimed in claim 1 in which said working roller has a grooved surface.

6. A rubber working machine comprising a working roller having a grooved surface, a feed roller having a plain surface, a delivery roller having a grooved surface, means for pressing said working and feed rollers together so as to form a "feed" nip, means for rotating said rollers, means providing a stationary surface which extends continuously from near said feed nip, beneath said working roller to above the level of the axis of said working roller and defines with the grooved surface of said working roller a space through which rubber which has passed said feed nip can pass in contact with said surface and with the surface of said working roller and means for guiding said rubber into said space and for preventing it from lapping round said feed roller.

7. A rubber working machine comprising a working roller and a delivery roller having intermeshing ribs and grooves, the configuration of one roller differing from that of the other, a feed roller, means for pressing said working and feed rollers together so as to form a "feed" nip, means for pressing said working and delivery rollers together so as to form a "delivery" nip, means for rotating said rollers, means providing a stationary surface which extends continuously from near said feed nip, beneath said working roller to above the level of the axis of said working roller and defines with the ribbed and grooved surface of said working roller a space through which rubber which has passed said feed nip can pass in contact with said surface and with the surface of said working roller and means for guiding said rubber into said space and for preventing it from lapping round said feed roller.

8. A rubber working machine as claimed in claim 7 in which the working and delivery rollers are provided with continuous ribs and grooves.

9. A rubber working machine as claimed in claim 7 in which the grooves in the working roller and the grooves in the delivery roller are of different depths.

10. A rubber working machine as claimed in claim 1 in which said means for guiding the rubber into said space and for preventing it from lapping round the feed roller comprise a scraper and means for pressing said scraper resiliently against said feed roller.

11. A rubber working machine as claimed in claim 1 in which said means for guiding the rubber into said space and for preventing it from lapping round the feed roller comprise a scraper, means for pressing said scraper resiliently against said feed roller and means for adjusting said scraper relatively to said feed roller.

12. A rubber working machine comprising a working roller and a feed roller having their axes in substantially the same horizontal plane, means for adjustably moving one roller towards and from the other so as to form a nip, means for rotating said rollers in opposite senses, means providing a surface which closely surrounds a substantial part of said working roller and serves to support the rubber which has passed said nip and is carried downwards by said working roller until said rubber has no further tendency to leave said working roller and a scraper coacting with one of the said rollers to cause the rubber to lap round only the working roller.

13. A rubber working machine as claimed in claim 12 comprising also a knife arranged for movement into contact with the surface of said working roller whereby to strip worked rubber from it.

14. A rubber working machine as claimed in claim 12 comprising a sharp edged scraper mounted for movement into and out of contact with said working roller and with said feed roller and disposed so that when in contact with said feed roller, it prevents lapping of said rubber round said feed roller and guides it into the space between said working roller and said surface and so that when in contact with said working roller, it closes said space and prevents lapping of said rubber round said working roller.

15. A rubber working machine comprising a working roller and a feed roller having their axes in substantially the same horizontal plane, means for adjustably moving one roller towards and from the other so as to form a nip, means for rotating said rollers at different speeds in opposite senses, means providing a surface which closely surrounds a substantial part of said working roller and serves to support the rubber which has passed said nip and is carried downwards by said working roller until said rubber has no further tendency to leave said working roller and a scraper coacting with one of the said rollers to cause the rubber to lap round only the working roller.

16. A continuous rubber plasticising or mixing machine comprising a working roller having a continuous circumferential groove in its surface, a feed roller arranged beside said working roller, means for pressing said rollers together so as to form a nip, means for rotating said rollers in opposite senses, means for preventing lapping of rubber which passes said nip round said feed roller and stationary means imposing a frictional restraint on rubber which moves with said working roller whereby to cause said rubber to travel axially along said working roller, said restraining means encircling said working roller over an arc subtending at least 180° but leaving said working roller uncovered over that portion which is immediately above said nip so as to allow rubber or other ingredients to be fed into the machine from above and to allow the progress of the treatment to which the rubber is subjected to be observed at all points along the length of said working roller.

17. A continuous rubber plasticising or mixing machine comprising a working roller having a continuous circumferential groove in its surface, a delivery roller having a continuous circumferential rib on its surface disposed above said working roller, a feed roller having a plain surface disposed beside said working roller, means for rotating said rollers, means for pressing said working and delivery rollers together with said groove and rib in engagement, means for pressing said working and feed rollers together and means extending round the lower part of said working roller between said feed roller and said delivery roller for preventing rubber which has passed between said working and feed rollers from falling away from said working roller and for yieldingly restraining the movement of said rubber with said working roller whereby to induce axial movement of said rubber along said working roller.

18. A rubber working or mixing machine comprising a pair of rollers, means for adjustably pressing said rollers together to form a nip, means for rotating said rollers, means for causing rubber fed to the nip of said rollers to lap round one only of said rollers, means for causing said rubber to travel axially along said last-mentioned roller and an extruding head arranged to receive said rubber directly as it is delivered from said roller.

19. A rubber extruding machine as claimed in claim 17 in which said groove is branched at the beginning of the tapered portion and continues over said portion as a double groove.

FREDERICK EDWARD BROWN.